US012565919B2

(12) United States Patent
Tsai

(10) Patent No.: US 12,565,919 B2
(45) Date of Patent: Mar. 3, 2026

(54) ONE-WAY AIR INLET MEMBER, CUSHION AIRBAG PAD AND MANUFACTURE METHOD THEREOF

(71) Applicant: Dongguan Jiashuan Industrial Co., Ltd., Dongguan (CN)

(72) Inventor: Peilin Tsai, Taiwan (CN)

(73) Assignee: Dongguan Jiashuan Industrial Co., Ltd., Dongguan (CN)

( * ) Notice: Subject to any disclaimer, the term of this patent is extended or adjusted under 35 U.S.C. 154(b) by 71 days.

(21) Appl. No.: 18/687,908

(22) PCT Filed: Mar. 25, 2022

(86) PCT No.: PCT/CN2022/083132
§ 371 (c)(1),
(2) Date: Feb. 29, 2024

(87) PCT Pub. No.: WO2023/082526
PCT Pub. Date: May 19, 2023

(65) Prior Publication Data
US 2025/0024960 A1     Jan. 23, 2025

(30) Foreign Application Priority Data

Nov. 11, 2021   (CN) .......................... 202111331587.0
Nov. 11, 2021   (CN) .......................... 202122753793.2

(51) Int. Cl.
*F16F 9/04*          (2006.01)
*A43B 17/03*        (2006.01)
(Continued)

(52) U.S. Cl.
CPC ............ *F16F 9/049* (2013.01); *A47C 27/081* (2013.01); *F16F 9/34* (2013.01); *F16K 15/20* (2013.01);
(Continued)

(58) Field of Classification Search
CPC ........ A47C 27/08; A47C 27/081; F16F 9/049; F16F 9/64; F16K 15/20
See application file for complete search history.

(56) References Cited

U.S. PATENT DOCUMENTS 2,068,134 A     1/1937   William
3,068,494 A    12/1962   Pinkwater
(Continued)

FOREIGN PATENT DOCUMENTS

CN        201480736 U   *   5/2010
CN        102425689 A   *   4/2012
(Continued)

*Primary Examiner* — Eric J Kurilla
(74) *Attorney, Agent, or Firm* — ScienBiziP, P.C.

(57)          ABSTRACT

A one-way air inlet member, cushion airbag pad and manufacture method thereof. The one-way air inlet member configured for mounting on a cushion airbag pad, wherein external gas enters the cushion airbag pad through the one-way air inlet member, but the one-way air inlet member prevents the gas in the cushion airbag pad from flowing out to outside. By means of a simple one-way air inlet member, the slow gas leakage can be prevented, thereby effectively preventing the air leakage of the cushion airbag pad, the slow gas leakage can be prevented, thereby effectively preventing the air leakage of the cushion airbag pad, and thus no need to be frequently inflated, convenient to use.

14 Claims, 10 Drawing Sheets

(51) Int. Cl.

| | |
|---|---|
| *A47C 27/08* | (2006.01) |
| *F16F 9/34* | (2006.01) |
| *F16K 15/20* | (2006.01) |

(52) U.S. Cl.
CPC ....... *A43B 17/035* (2013.01); *F16F 2222/126* (2013.01)

(56) References Cited

U.S. PATENT DOCUMENTS

| | | | | |
|---|---|---|---|---|
| 3,133,696 A | * | 5/1964 | Mirando | A47C 27/081 |
| | | | | 92/92 |
| 3,155,991 A | * | 11/1964 | Dunham | A47C 27/084 |
| | | | | 5/709 |
| 4,966,197 A | * | 10/1990 | Jaron | F16K 15/147 |
| | | | | 137/846 |
| 5,144,708 A | * | 9/1992 | Pekar | A47C 27/084 |
| | | | | 137/846 |
| 5,145,338 A | * | 9/1992 | Murray | F04B 43/08 |
| | | | | 92/92 |
| 5,372,487 A | * | 12/1994 | Pekar | F16K 15/147 |
| | | | | 137/846 |
| 5,558,441 A | * | 9/1996 | Morrison | B65D 33/01 |
| | | | | 383/44 |
| 5,564,143 A | | 10/1996 | Pekar et al. | |
| 5,632,055 A | | 5/1997 | Graf | |
| 6,019,122 A | * | 2/2000 | Chen | F16K 15/202 |
| | | | | 137/846 |
| 6,170,513 B1 | * | 1/2001 | Lo | F16K 15/147 |
| | | | | 446/224 |
| 6,402,190 B1 | * | 6/2002 | Heudorfer | B60R 21/233 |
| | | | | 137/846 |
| 6,934,989 B2 | | 8/2005 | Ledvina et al. | |
| 7,146,665 B1 | * | 12/2006 | Moorin | A47C 7/383 |
| | | | | 5/639 |
| 7,412,738 B2 | * | 8/2008 | Chaffee | A47C 20/027 |
| | | | | 5/655.3 |
| 2004/0064892 A1 | | 4/2004 | Ledvina et al. | |
| 2005/0125905 A1 | * | 6/2005 | Wilkinson | A61G 7/05776 |
| | | | | 5/709 |
| 2018/0017177 A1 | * | 1/2018 | Marson | A47C 27/10 |

FOREIGN PATENT DOCUMENTS

| | | | | | |
|---|---|---|---|---|---|
| CN | 102726989 A | * | 10/2012 | | A47C 27/10 |
| CN | 113712341 A | * | 11/2021 | | A43B 7/081 |
| CN | 114041942 A | * | 2/2022 | | B62J 1/26 |
| CN | 217566607 U | * | 10/2022 | | A61G 13/10 |
| CN | 217886418 U | * | 11/2022 | | A63B 71/14 |
| CN | 217886419 U | * | 11/2022 | | A43B 17/03 |
| CN | 218816827 U | * | 4/2023 | | A47C 27/081 |
| DE | 4413445 A1 | * | 10/1995 | | A47C 27/08 |
| GB | 2269743 A | | 2/1994 | | |
| TW | M254938 U | * | 1/2005 | | |
| TW | M290815 U | * | 5/2006 | | |
| TW | 1787015 B | * | 12/2022 | | A47C 27/10 |
| WO | WO-9403089 A1 | * | 2/1994 | | A47C 27/081 |

* cited by examiner

200

60

631

635

6333

6333

6331

611,621

651

611,621

6511

60

635,651

611,621

611,621

6513

ONE-WAY AIR INLET MEMBER, CUSHION AIRBAG PAD AND MANUFACTURE METHOD THEREOF

CROSS REFERENCE TO RELATED APPLICATIONS

This disclosure priority to Chinese Patent Application No. 202111331587.0, entitled "CUSHION AIRBAG PAD", and Chinese Patent Application No. 202122753793.2, entitled "CUSHION AIRBAG PAD", filed with the Chinese Patent Office on Nov. 11, 2021, which are incorporated herein by reference in their entireties.

TECHNICAL FIELD

The present disclosure relates to the field of household appliances, and in particular, to a one-way air inlet member and a cushion airbag pad and the manufacture method thereof.

BACKGROUND

In daily life, shoulder strap backpack, waist bag, shoulder bag, arm bag, and the like are often used for home, automobile, medical, sports, and other package products. Traditional package products often only focus on the loading functionality of the backpack. During design or purchase, more consideration is given to how many bags are provided for the backpack, how much things can be hold, how good the appearance is, and so on, but the comfort of people when using the backpack is rarely considered. During using backpacks, weight is generally concentrated on the shoulders, waist, neck or arms of the human body. However, during use, a person in motion will generate a tiny vibration, and the lap belt of the backpack will generate collision force and friction force on the contact position. This collision and friction forces create a rather powerful negative effect, especially when the person exercise vigorously. When there are many articles to be worn or they are used for a long time, local blood circulation is blocked by long-term pressure at these parts, which brings pain, moreover, the parts in contact are both air-tight, and sweat is easily generated and cannot effectively dissipate heat, which causes people to feel extremely uncomfortable and affects the health of the skin and leaves a health hazard; therefore, an airbag pad having a buffering effect is very popular. The airbag pad has a plurality of airbags and air inlets in communication with one another, with external air entering the airbags through the air inlets.

However, in the existing airbag pad, after gas filled in the airbags of the airbag pad, part of the gas slowly leaks outside through the air inlet, and therefore, the overall airbag pad appears a phenomenon of slow air leakage, resulting in the gas in the airbag being insufficient after using the cushion for a period of time, but also the cushion needs to be inflated again, thereby causing inconvenience in use.

SUMMARY OF THE INVENTION

In order to solve the described problem, the present disclosure provides a one-way air inlet member preventing air leakage.

In order to achieve the above object, the present disclosure adopts the following technical solutions:

A one-way air inlet member configured to mount in a cushion airbag pad, external gas enter into the cushion airbag pad through the one-way air inlet member, but the one-way air inlet member prevents the gas in the cushion airbag pad from flowing out to the outside.

Furthermore, the one-way air inlet member comprises an inlet portion and an outlet portion, the inlet portion is used for receiving gas from outside, the outlet portion is in communication with the inlet portion, the inlet portion remains open all the time, the outlet portion is in a closed state when in a non-air outlet state, so as to prevent the gas in the cushion airbag pad from flowing back to the outside.

Furthermore, the one-way air inlet member is formed by attaching side edge of a film-shape upper sheet and side edge of a film-shape lower sheet, when the outlet portion is in a ventilation state, the upper sheet and the lower sheet at the outlet portion are in a separated state; when the outlet portion is in a closed state, the upper sheet and the lower sheet at the outlet portion change from a separated state to a closed state.

Furthermore, the upper sheet and the lower sheet are made of the same material.

Furthermore, the outlet portion has one or more air inlet passages, and the one or more air inlet passages are respectively in communication with the inlet portion.

A cushion airbag pad comprising a first airbag, a second airbag and a ventilation passage, the first airbag and the second airbag communicating with each other through the ventilation passage, Wherein an air inlet is provided at one side of the first airbag, the ventilation passage is disposed at one side of the first airbag faced to the second airbag, and the air inlet is in communication with outside, the cushion airbag pad further comprises a one-way air inlet member, so that the gas in the first airbag enter the second airbag via the one-way air inlet member, but the gas in the second airbag is prevented from entering the first airbag.

Furthermore, the one-way air inlet member comprises an inlet portion and an outlet portion, the inlet portion is used for receiving gas from the ventilation passage of the first airbag, the outlet portion is in communication with the inlet portion and the second airbag, the inlet portion remains open all the time, the outlet portion is in a closed state when in a non-air outlet state, so as to prevent the gas in the second airbag from flowing back to the first airbag.

Furthermore, the inlet portion is attached to an inner wall of the first airbag and an inner wall of the ventilation passage, and the outlet portion is accommodated inside the second airbag, the outlet portion changes from a closed state to a ventilation state under the action of an airflow pressure in the first airbag, so that the gas in the first airbag enters the second airbag unidirectionally via the one-way air inlet member.

Furthermore, the one-way air inlet member is formed by attaching side edge of a film-shape upper sheet and side edge of a film-shape lower sheet, when the outlet portion is in a ventilation state, the upper sheet and the lower sheet at the outlet portion are in a separated state, so that the gas in the first airbag enter the second airbag via the outlet portion; when the outlet portion is in a closed state, the upper sheet and the lower sheet at the outlet portion change from a separated state to a closed state, so that the gas in the second airbag doesn't enter the first airbag via the outlet portion.

A manufacture method of a cushion airbag pad, comprising the following steps:

Step 1: preparing a lower cushion body and an upper cushion body, and a one-way air inlet member;

Step 2: a one-way air outlet valve being attached to the air outlet of the lower cushion body;

Step 3: attaching a part of the one-way air inlet member to the upper cushion body and the lower cushion body, so that the one-way air inlet member forming an air inlet space with one end opened;

Step 4: attaching the whole of the lower cushion body and the upper cushion body together to obtain a finished product of the cushion airbag pad.

Furthermore, a manufacture method of the one-way air inlet member comprising the following steps:

Step a: preparing two sheets and a voltage mold, wherein the two sheets disposed in the voltage mold;

Step b: attaching two side edges of the two sheets to obtain a finished product of the one-way air inlet member, the structure of the one-way air inlet member being formed as a structure in which two ends are open and two sides are closed, and the two ends are communicated with the middle portion.

Furthermore, a manufacture method of the one-way air inlet member comprising the following steps:

Step a: preparing two sheets and insulating ink, wherein the insulating ink applied to a predetermined position on the inner wall of at least one sheet;

Step b: attaching two side edges of the two sheets to obtain a finished product of the one-way air inlet member, the structure of the one-way air inlet member being formed as a structure in which two ends are open and two sides are closed, and the two ends are communicated with the middle portion.

A manufacture method of a cushion airbag pad, comprising the following steps:

Step 1: preparing a lower cushion body and an upper cushion body, and a one-way air inlet member;

Step 2: a one-way air outlet valve being attached to the air outlet of the lower cushion body;

Step 3: attaching a part of the one-way air inlet member to the upper cushion body and the lower cushion body, so that the one-way air inlet member forming an air inlet space with one end opened;

Step 4: attaching the whole of the lower cushion body and the upper cushion body together to obtain a finished product of the cushion airbag pad.

Furthermore, a manufacture method of the one-way air inlet member comprising the following steps:

Step a: preparing two sheets and a voltage mold, wherein the two sheets disposed in the voltage mold;

Step b: attaching two side edges of the two sheets to obtain a finished product of the one-way air inlet member, the structure of the one-way air inlet member being formed as a structure in which two ends are open and two sides are closed, and the two ends are communicated with the middle portion.

Furthermore, a manufacture method of the one-way air inlet member comprising the following steps:

Step a: preparing two sheets and insulating ink, wherein the insulating ink applied to a predetermined position on the inner wall of at least one sheet;

Step b: attaching two side edges of the two sheets to obtain a finished product of the one-way air inlet member, the structure of the one-way air inlet member being formed as a structure in which two ends are open and two sides are closed, and the two ends are communicated with the middle portion.

According to the cushion airbag apparatus in the present disclosure, by means of such a one-way air inlet member, the slow gas leakage can be prevented, thereby effectively preventing the air leakage of the cushion airbag pad, and thus no need to be frequently inflated, convenient to use.

DETAILED DESCRIPTION

In order to make the purpose, technical solutions, and advantages of the present disclosure clearer, the following further describes the present disclosure in detail with reference to the accompanying drawings and embodiments. It should be understood that the embodiments described herein are only intended to explain the present disclosure, but not to limit the present disclosure.

Figure 1:
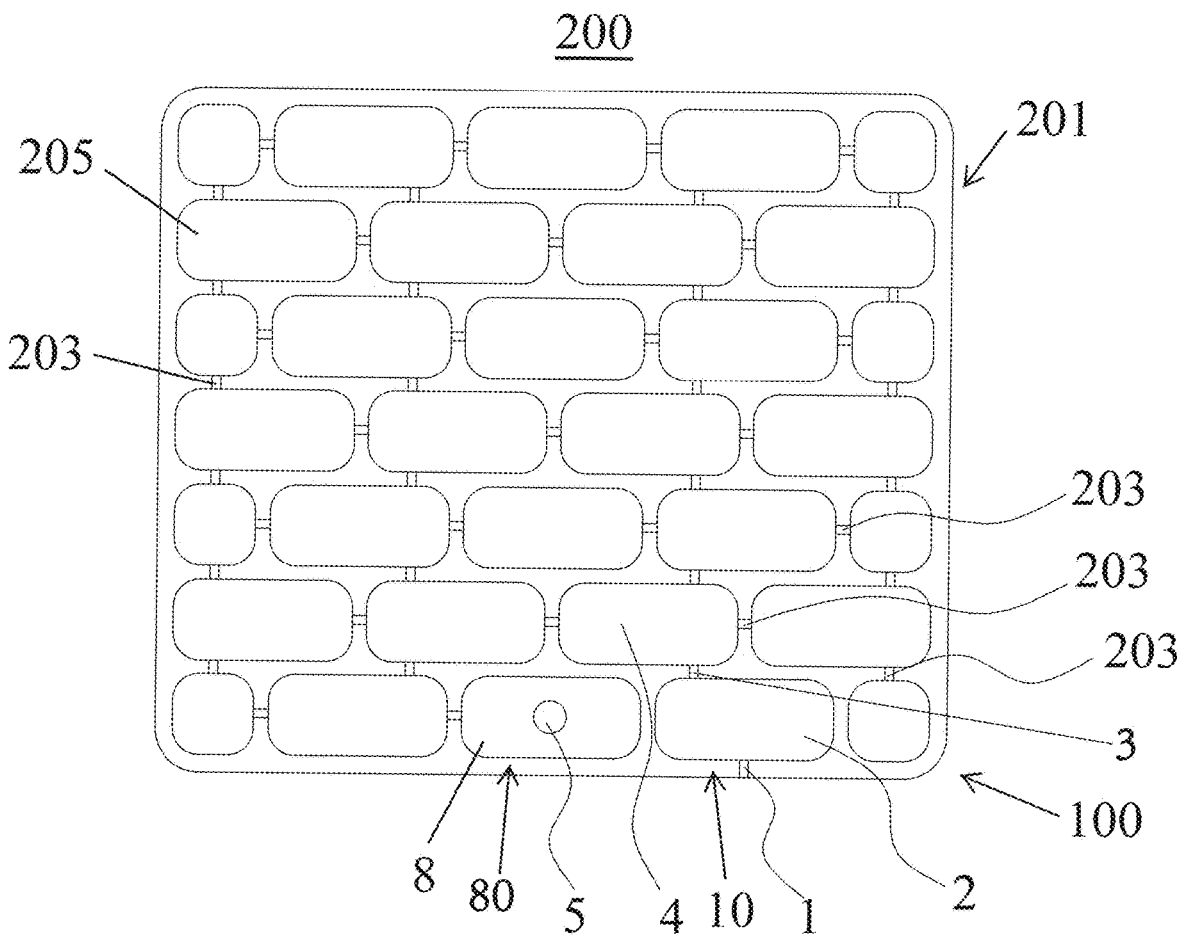
FIG. 1 is an isometric view of a cushion airbag pad according to the present disclosure.
Figure 2:
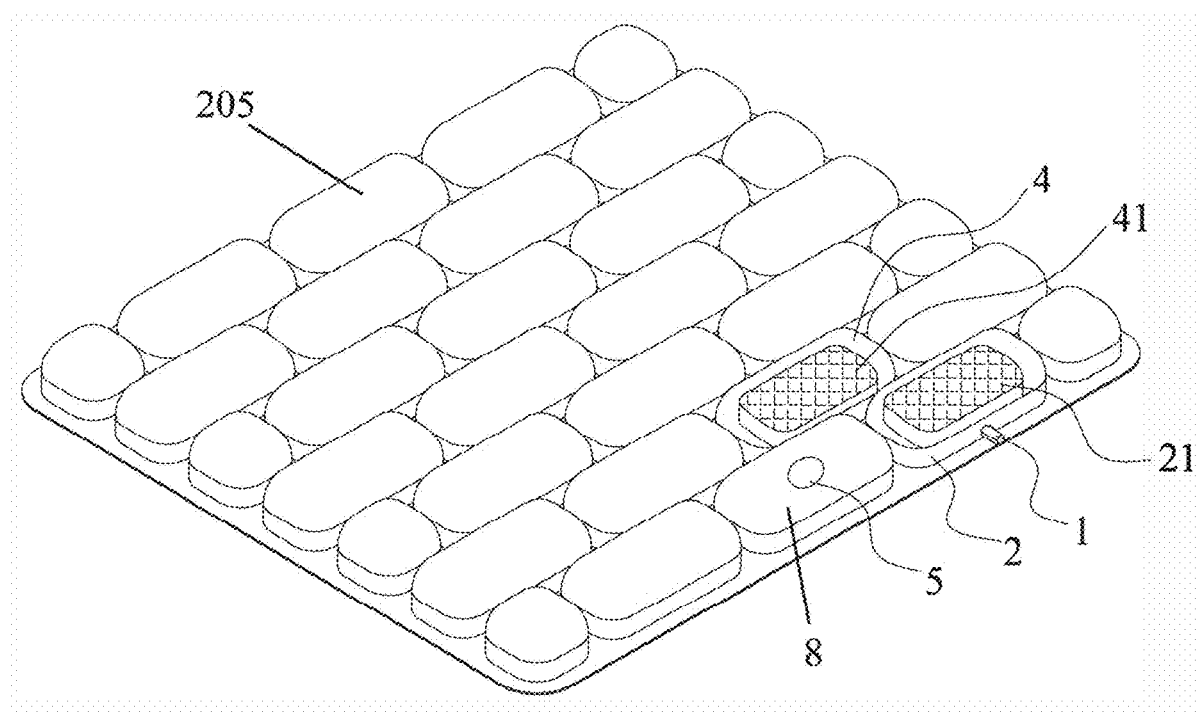
FIG. 2 is a perspective view of the cushion airbag pad according to the present disclosure.

FIGS. 1 and 2 show a cushion airbag pad 200 according to the present disclosure, which includes a main body 201 and a cushion airbag apparatus 100 disposed in the main body 201.

The main body 201 includes a plurality of airbags 205 communicating through a plurality of air passages 203, one of the plurality of airbags 205 communicates with the cushion airbag apparatus 100 through one air passage 203.

The cushion airbag apparatus 100 includes an inlet assembly 10 and an outlet assembly 80, the inlet assembly 10 is communicatively connected with a plurality of airbags 205 through a plurality of air passages 203. The inlet assembly 10 includes a first airbag 2, a second airbag 4, a ventilation passage 3, a third airbag 8 and an elastomer 21.

The first airbag 2 has an air inlet function, an air inlet 1 is provided at one side of the first airbag 2, a ventilation passage 3 is provided at a side faced to the second airbag 4, and the air inlet 1 is in communication with the outside. The other side of the first airbag 2 communicates with the second airbag 4 through the ventilation passage 3, so that the gas enters the second airbag 4 from the first airbag 2 through the ventilation passage 3. The air inlet 1 communicates with the outside.

The second airbag 4 is in communication with a plurality of airbags 205 through a plurality of air passages 203. The first airbag 2 and the second airbag 4 are connected in series, so that the flow of the gas is in one direction, so as to achieve the buffering effect and the effect of quick inflation.

The elastomer 21 is disposed in the first airbag 2 and can support the first airbag 2 to pop up so that the first airbag 2 is filled with gas for inlet and outlet of the first airbag 2. It should be understood that the elastomer may be any one of sponge, plastic, spring, rubber, and silica gel, as long as it is an elastic component.

Typically, the elastomer is only disposed within the first airbag 2. It can be understood that the second airbag 4 may also be provided with an elastomer 41 (see FIG. 2), as long as the elastomer is provided in the plurality of airbags according to actual needs.

In use, no inflation jig is required, just squeeze or press the first airbag 2. Specifically, when the first airbag 2 is squeezed or pressed, the elastomer 21 in the first airbag 2 is compressed, the gas in the first airbag 2 enters the second airbag 4, and the gas in the second airbag 4 enters the plurality of airbags 205 via the plurality of air passages 203, so that the entire cushion airbag pad 200 is filled with the gas. When the first airbag 2 is released after the squeezing or pressing is released, the elastomer 21 supports the first airbag 2 to reset under the elastic reset action of the elastomer 21. At this time, the gas is sucked into the first airbag 2 through the air inlet 1 under the action of the pressure difference.

Compared with the prior art, in the cushion airbag apparatus designed by the present disclosure, the first airbag 2 and the second airbag 4 can be inflated at any time and any place by means of an elastomer without an additional inflation jig, therefore, the airbag can be inflated by simply pressing the elastomer 21 even outdoors, thereby facilitating inflation. In addition, when pressure is encountered, the airbag 205 of the cushion airbag pad 200 can be compressed, thereby achieving a cushioning effect.

Figure 3:
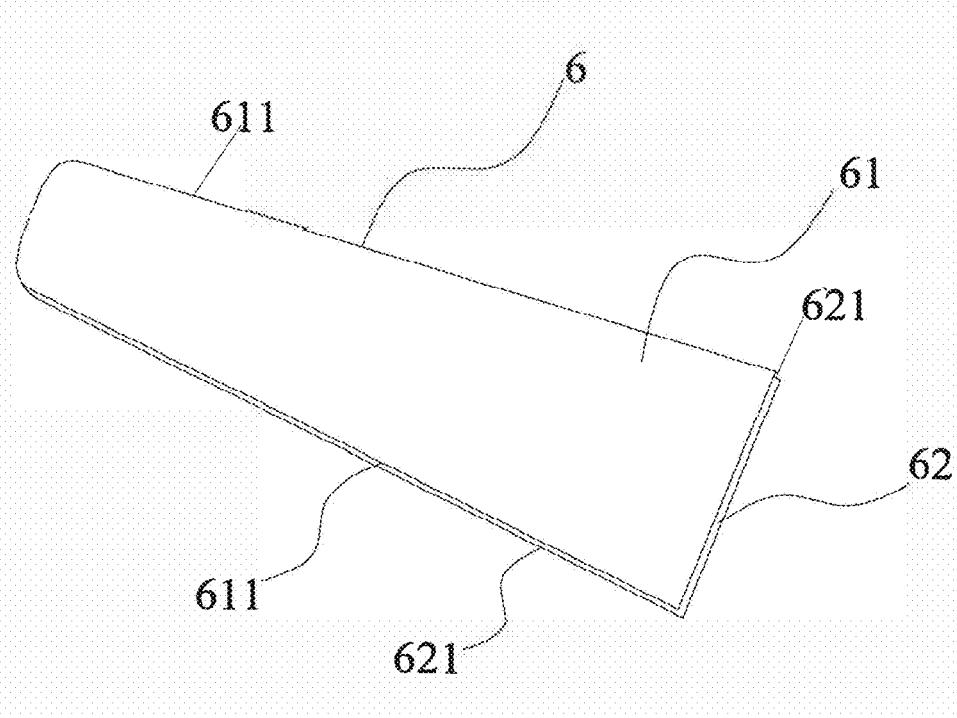
FIG. 3 is an isometric top view of a one-way air inlet member of the first embodiment of the cushion airbag pad according to the present disclosure.
Figure 4:
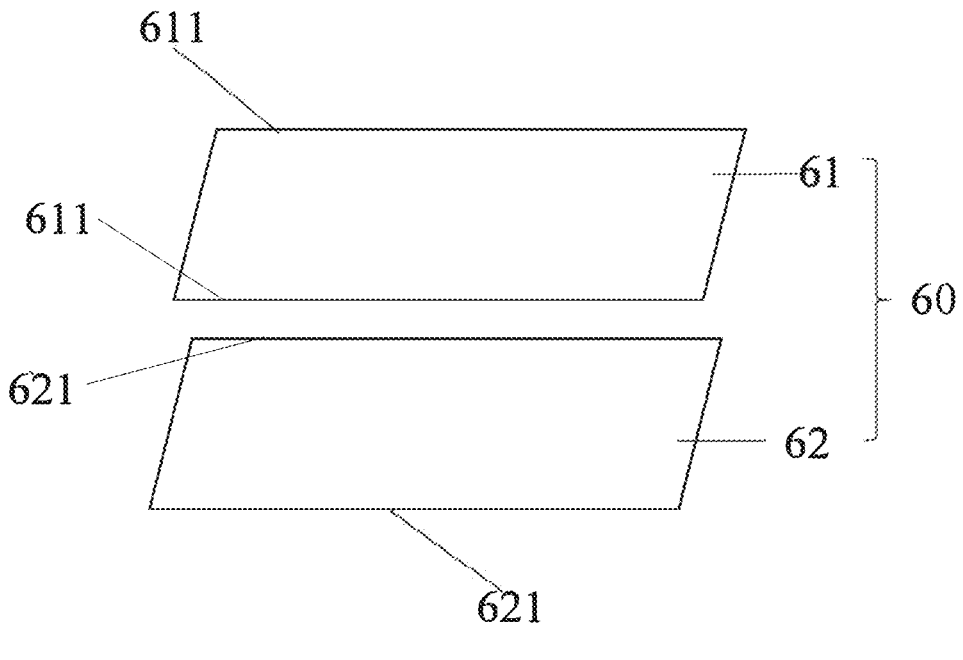
FIG. 4 is an exploded view of the one-way inlet member of the cushion airbag pad according to the present disclosure.

With further reference to FIG. 3 and FIG. 4, the cushion airbag apparatus 100 can further include the one-way air inlet member 6 of the first embodiment. The one-way air inlet member 6 is disposed in the first airbag 2, the second airbag 4 and the ventilation passage 3, so that the gas in the first airbag 2 can be unidirectionally introduced into the second airbag 4, thereby achieving the effect of being capable of only introducing air and not deflating.

Figure 5:
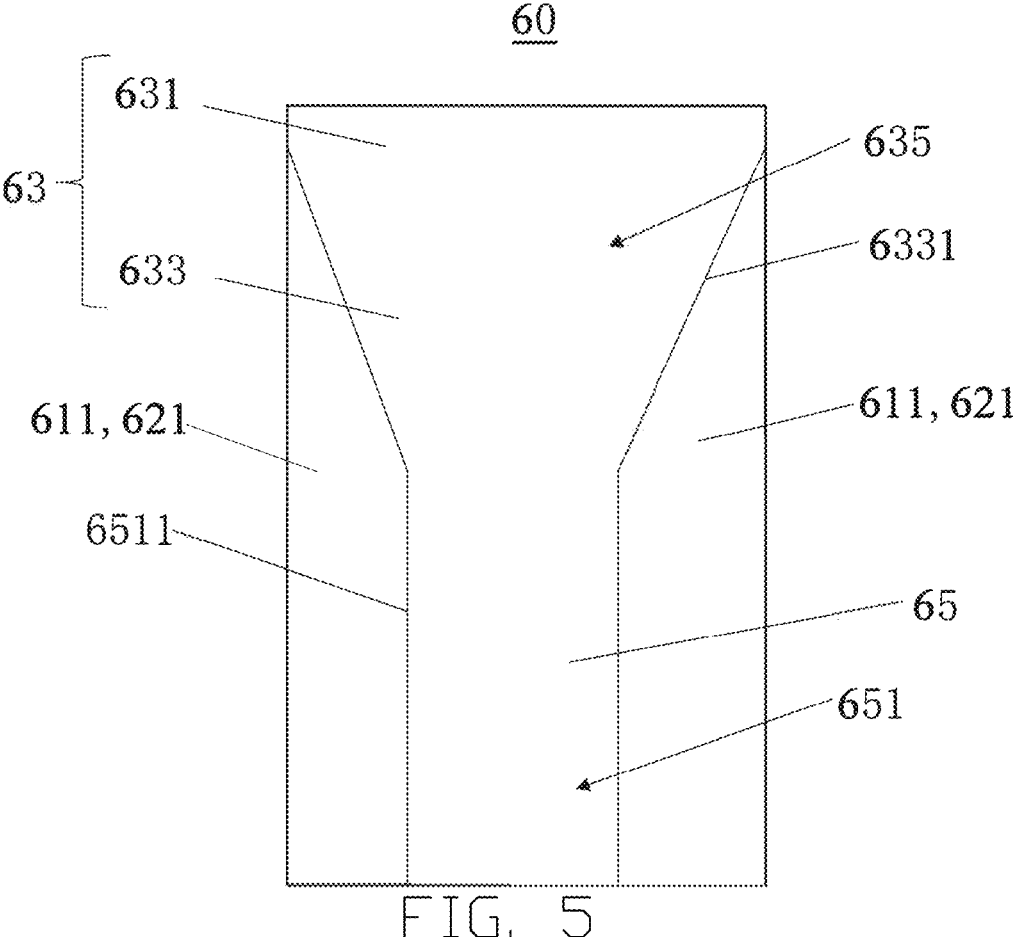
FIG. 5 is an isometric view of the one-way air inlet member of the second embodiment of the cushion airbag pad according to the present disclosure.

Referring further to FIG. 5, the one-way air inlet member 60 of the second embodiment of the cushion airbag apparatus 100 according to the present disclosure is formed by attaching a thin-film upper sheet 61 and a thin-film lower sheet 62. Specifically, a side edge 611 of the upper sheet 61 and a side edge 621 of the lower sheet 62 are bonded together by using a upper and lower high frequency voltage on the high frequency machine, so that the structure of the one-way air inlet member 60 is formed as a structure in which two ends are open and two sides are closed, and the two ends are communicated with the middle portion. It can be understood that, the bonding manner between the side edge 611 of the upper sheet 61 and the side edge 621 of the lower sheet 62 is not limited to the high frequency voltage bonding manner, and the side edge 611 of the upper sheet 61 and the side edge 621 of the lower sheet 62 may also be bonded together by means of upper and lower hot melt using a thermocompressor, and the side edge 611 of the upper sheet 61 and the side edge 621 of the lower sheet 62 may also be bonded together using thermosol. Since the upper sheet 61 and the lower sheet 62 are made of the same material, such as plastic pieces, and are flat as a whole, the upper sheet 61 and the lower sheet 62 can have an attracting effect when contacting each other, and thus can close the air passage. It can be understood that, the structure of the one-way air inlet member 60 is not limited to the structure formed by bonding the upper sheet 61 and the lower sheet 62, for example, the integrally molded cylindrical element is pressed into a flat structure to form the one-way air inlet member 60, so that the one-way air inlet member 60 having the flat structure is directly formed into the one-way air inlet member 60 without performing the step of bonding the upper sheet 61 and the lower sheet 62. In the current embodiment, the upper sheet 61 and the lower sheet 62 are made of, for example, polyether TPU and polyester TPU (thermoplastic polyurethanes) or PVC, EVA or other plastic sheet materials.

The one-way air inlet member 60 includes an inlet portion 63 and an outlet portion 65. The inlet portion 63 is attached to an inner wall of the first airbag 2 and an inner wall of the ventilation passage 3 by the upper and lower high frequency voltage on the high frequency machine, so that the inlet portion 63 is attached to the inner wall of the first airbag 2 and the inner wall of the ventilation passage 3, and the outlet portion 65 is accommodated inside the second airbag 4.

Figure 12:
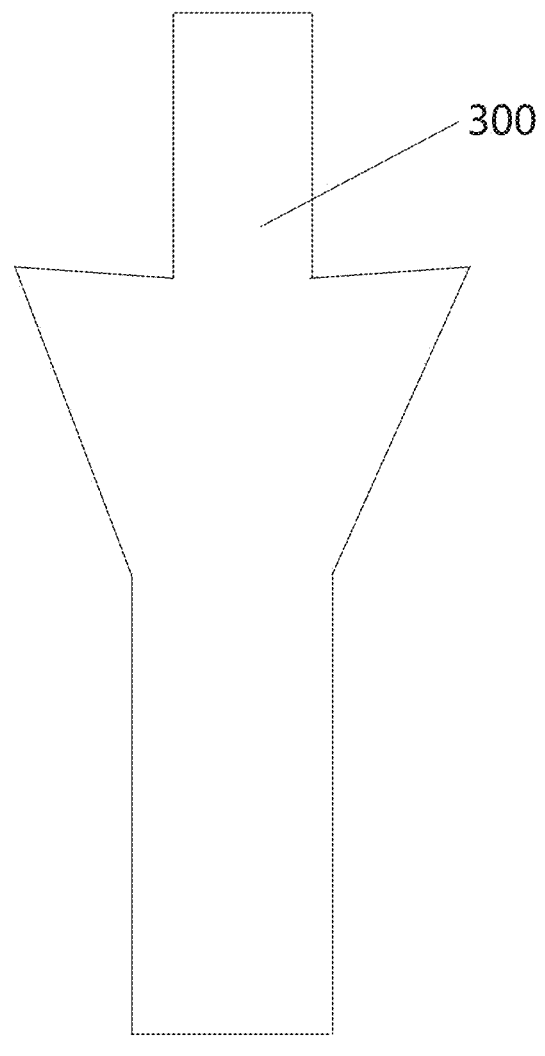
FIG. 12 is an isometric view of a jig used in the process for producing the cushion airbag pad according to the present disclosure.

The structure of the inlet portion 63 is a structure that is always open and does not close. The inlet portion 63 includes an opening end 631 and a mounting portion 633. The upper sheet 61 and the lower sheet 62 at the opening end 631 are in an open state, so that a jig 300 (referring to FIG. 12) can be easily inserted into the mounting portion 633 and the outlet portion 65 from the opening end 631 in the process of attaching the one-way air inlet member 60 to the first airbag 2 and the ventilation passage 3. It can be understood that the opening end 631 can be omitted, and when the jig 300 is inserted into the mounting portion 633 and the outlet portion 65, the upper sheet 61 and the lower sheet 62 at the mounting portion 633 can be separated from each other.

The mounting portion 633 is extended along a direction from one side of the open end 631 towards the outlet portion 65 (namely, the direction away from the open end 631), and the mounting portion 633 is funnel shape. The mounting portion 633 includes two inclined portions 6331 that extend obliquely from a side of the open end 631 towards the outlet portion 65, respectively, and a width between the two inclined portions 6331 becomes narrower closer to the outlet portion 65. The mounting portion 633 forms an air inlet space 635 between the two inclined portions 6331, and the air inlet space 635 is in communication with the open end 631. It can be understood that the mounting portion 633 is not limited to the funnel shape, and the shape of the mounting portion 633 is only required to facilitate attachment to the first airbag 2 and the ventilation passage 3.

The outlet portion 65 extends from a side of the mounting portion 633 away from the opening end 631 along a direction away from the mounting portion 633, and is communicated with the opening end 631 of the air inlet portion 63 and the mounting portion 633. The outlet portion 65 is closed in a non-air outlet state to prevent the air in the second airbag 4 from flowing back to the first airbag 2, and the outlet portion 65 is switched from a closed state to a ventilation state in an air outlet state (under the action of an airflow pressure), so that the air in the first airbag 2 enters the second airbag 4 unidirectionally via the one-way air inlet member 60.

The outlet portion 65 includes two side portions 6511, and one end portion of the two side portions 6511 is connected to one end portion of the two inclined portions 6331. In the present embodiment, the two side portions 6511 and the two inclined portions 6331 are bonding boundary lines formed when bonding the side edges 611 of the upper sheet 61 and the side edges 621 of the lower sheet 62, that is, the portions of the upper sheet 61 and the lower sheet 62 at the inlet portion 63 and the outlet portion 65 which are not bonded together. An air inlet passage 651 is formed between the two side portions 6511 of the air outlet portion 65, and the air inlet passage 651 is in communication with the air inlet space 635. The upper sheet 61 and the lower sheet 62 at the air outlet portion 65 contact each other and are attracted together, and at this time, the air inlet passage 651 is in a closed state, and when air is introduced, the upper sheet 61 and the lower sheet 62 at the air inlet passage 651 are separated to form an air inlet passage 651 capable of introducing air.

When the cushion airbag pad 200 is used, the first airbag 2 is squeezed or pressed, at this time, the elastomer 21 in the first airbag 2 is compressed, the gas in the first airbag 2 enters the outlet portion 65 via the inlet portion 63, and at this time, the gas outlet is from a closed state to become a ventilation state, that is, the upper sheet 61 and the lower sheet 62, which are originally adsorbed together at the outlet portion 65 (in a closed state), are separated from each other by the air pressure (in a separated state) to form an air inlet passage 651 that can be ventilated. After the gas enters the second airbag 4 through the air inlet passage 651, the upper sheet 61 and the lower sheet 62 at the outlet portion 65 are brought into contact with each other and are adsorbed together, so that the air inlet passage 651 is in a closed state, and the gas entering the second airbag 4 then enters the plurality of airbags 205 through the plurality of air passages 203, in turn, the gas fills the entire cushion airbag pad 200.

After the squeezing or pressing of the first airbag 2 is released, the first airbag 2 pops up to reset under the elastic reset action of the elastomer 21, at this time, the upper sheet 61 and the lower sheet 62 at the outlet portion 65 of the one-way air inlet member 60 contact each other and are attracted together, so that the air inlet passage 651 is in a closed state, and thus the air in the second airbag 4 cannot enter the first airbag 2 through the outlet portion 65, thus, the gas of the second airbag 4 is prevented from flowing backward into the first airbag 2, and one-way air inlet is realized.

In the second embodiment, the air inlet passage 651 of the one-way air inlet member 60 is an air inlet passage, but also may be a plurality of air inlet passages, as long as the plurality of air inlet passages are respectively communicated with the inlet portion 63.

In the second embodiment, the two inclined portions 6331 and the two side portions 6511 of the one-way air inlet member 60 form a boundary line, and the side edges 611 and 621 of the upper sheet 61 and the lower sheet 62 are integrally attached together. However, the structure of the one-way air inlet member 60 is not limited to the above structure.

Figure 6:
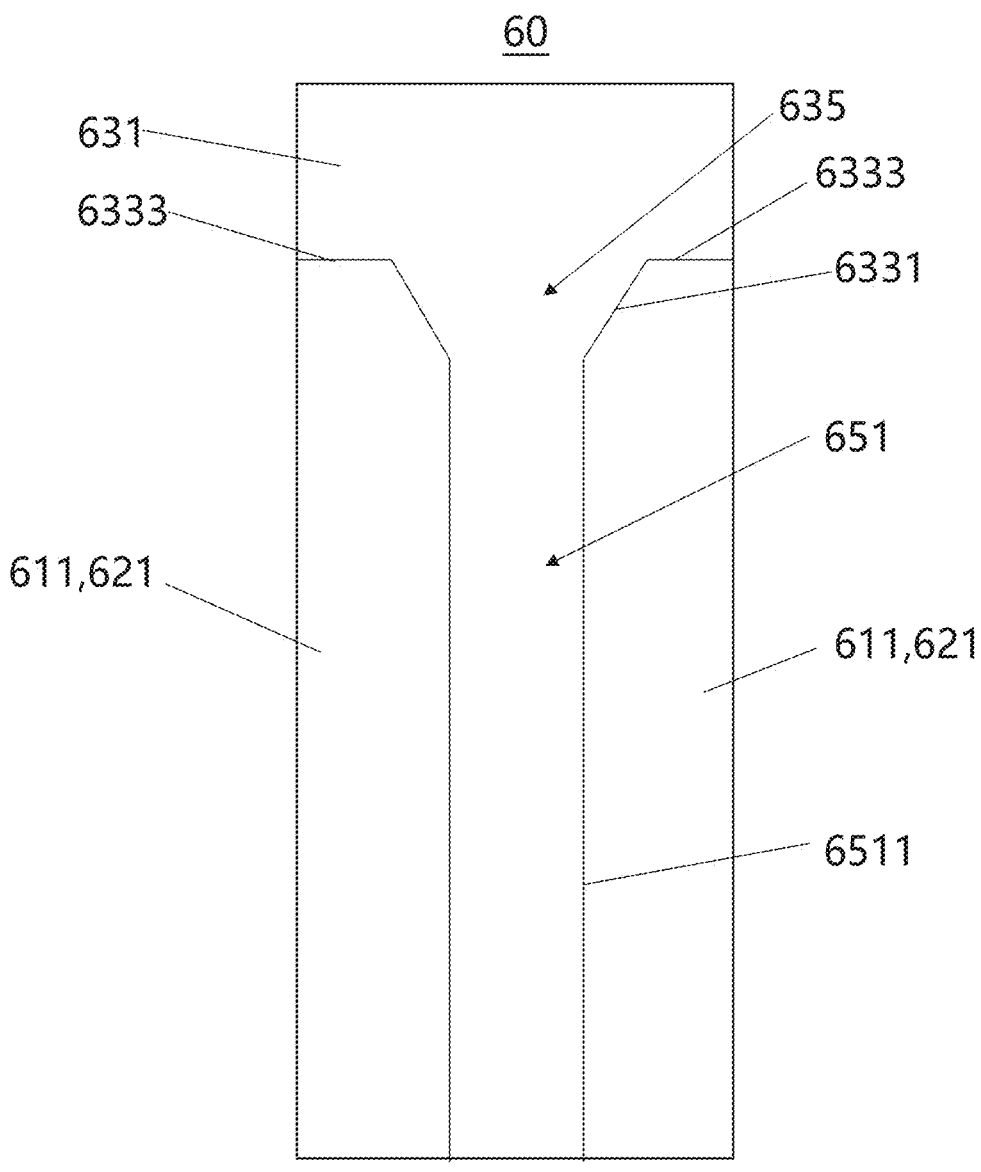
FIG. 6 is an isometric view of the one-way air inlet member of the third embodiment of the cushion airbag pad according to the present disclosure.

With further reference to FIG. 6, the one-way air inlet member 60 in the third embodiment is substantially identical to the one-way air inlet member 60 in the second embodiment, the difference is that the structure of the open end 631 is different as follows. The bottom end of the open end 631 is provided with two bottoms 6333, the two bottom portions 6333 are respectively connected to one ends of the two inclined portions 6331 so that the two side portions 6511, the two inclined portions 6331, and the two bottom portions 6333 are formed as attachment boundary line which is formed when attaching the side edges 611 of the upper sheet 61 and the side edges 621 of the lower sheet 62.

Figure 7:
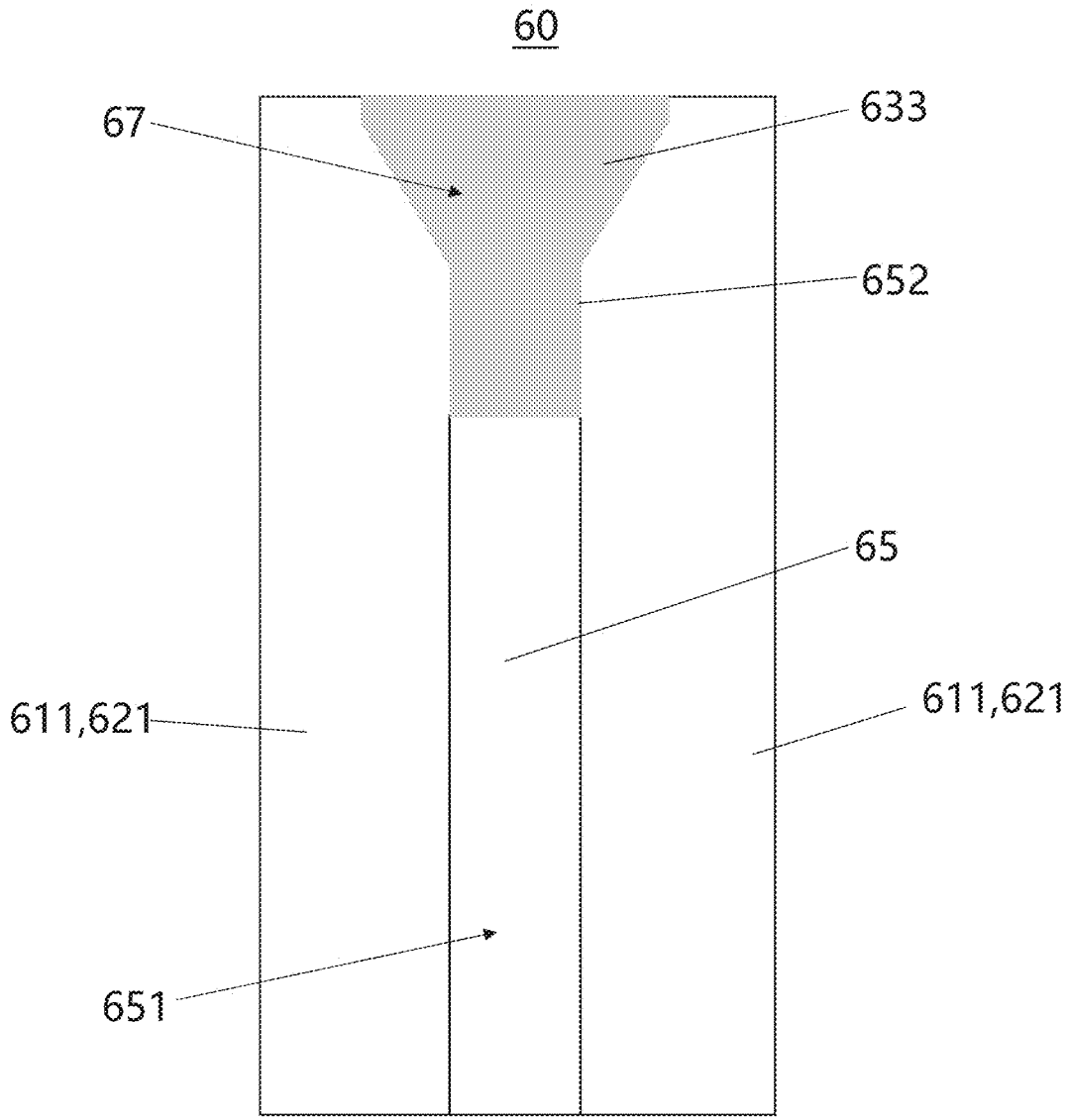
FIG. 7 is an isometric view of the one-way air inlet member of the fourth embodiment of the cushion airbag pad according to the present disclosure.

With further reference to FIG. 7, the one-way air inlet member 60 in the fourth embodiment is substantially the same as that in the second embodiment except that an insulating ink 67 is applied to the inner wall of the upper sheet 61 and the inner wall of the lower sheet 62 corresponding to a portion of the mounting portion 633 and the outlet portion 65. In the present embodiment, the insulating ink 67 is an anti-adhesive ink, but may be another insulating coating layer, as long as the insulating coating layer is used for preventing a part of the upper sheet 61 and the lower sheet 62 applied with the insulating coating layer from being adhered to each other. In the present embodiment, the insulating ink 67 may be applied to a predetermined position on the inner wall of at least one sheet (the upper sheet 61 or the lower sheet 62) or may be applied to both of the inner wall of the upper sheet 61 and the inner wall of the lower sheet 62.

The side edges 611 and the side edges 621 of the two sheets are applied an up-down voltage by using a high-speed wave machine, so that the side edges 611 and the side edges 621 are adhered together. Due to the presence of the insulating ink 67, a part of the inner wall of the upper sheet 61 and the inner wall of the lower sheet 62 coated with the insulating ink on the inner wall are not adhered together, forming the mounting portion 633 and the air outlet portion 65 which are communicated with each other. The two sheets are made of the same material, for example, polyether TPU and polyester TPU (thermoplastic polyurethanes) or PVC, EVA or other plastic sheet materials.

Figure 8:
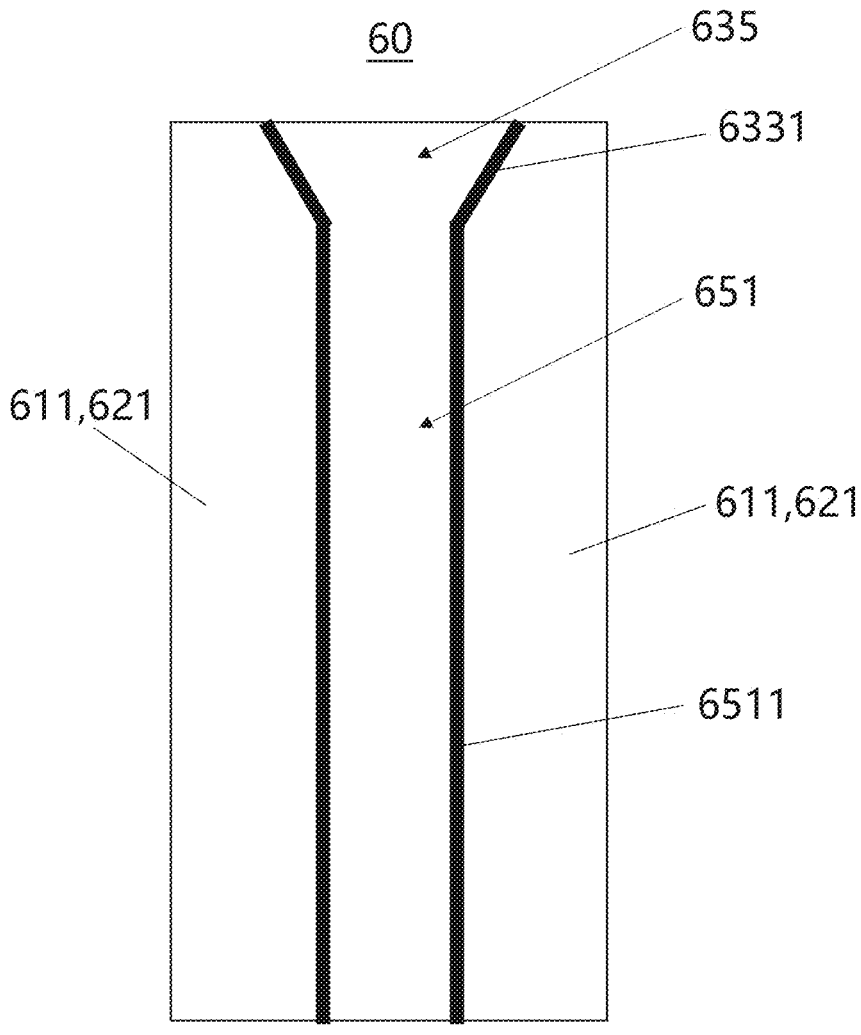
FIG. 8 is an isometric view of the one-way air inlet member of the fifth embodiment of the cushion airbag pad according to the present disclosure.

With further reference to FIG. 8, the one-way air inlet member 60 in the fifth embodiment is substantially the same as the one-way air inlet member 60 in the second embodiment except that the side edges 611, 621 of the upper and lower sheets 61, 62 of the one-way air inlet member 60 are not integrally attached. Specifically, in the one-way air inlet member 60 of FIG. 8, only the two inclined portions 6331 and the two side portions 6511 are partially attached together, while the side edges 611, 621, the air inlet space 635, and the upper sheet 61 and the lower sheet 62 of the air inlet passage 651 are not attached together. Therefore, the one-way air inlet member 60 of FIG. 8 is formed by attaching the upper sheet 61 and the lower sheet 62 in a film shape along two parallel side portions 6511 (linear portions) and two inclined portions 6331 respectively extending obliquely from one end of the side portions 6511.

Figure 9:
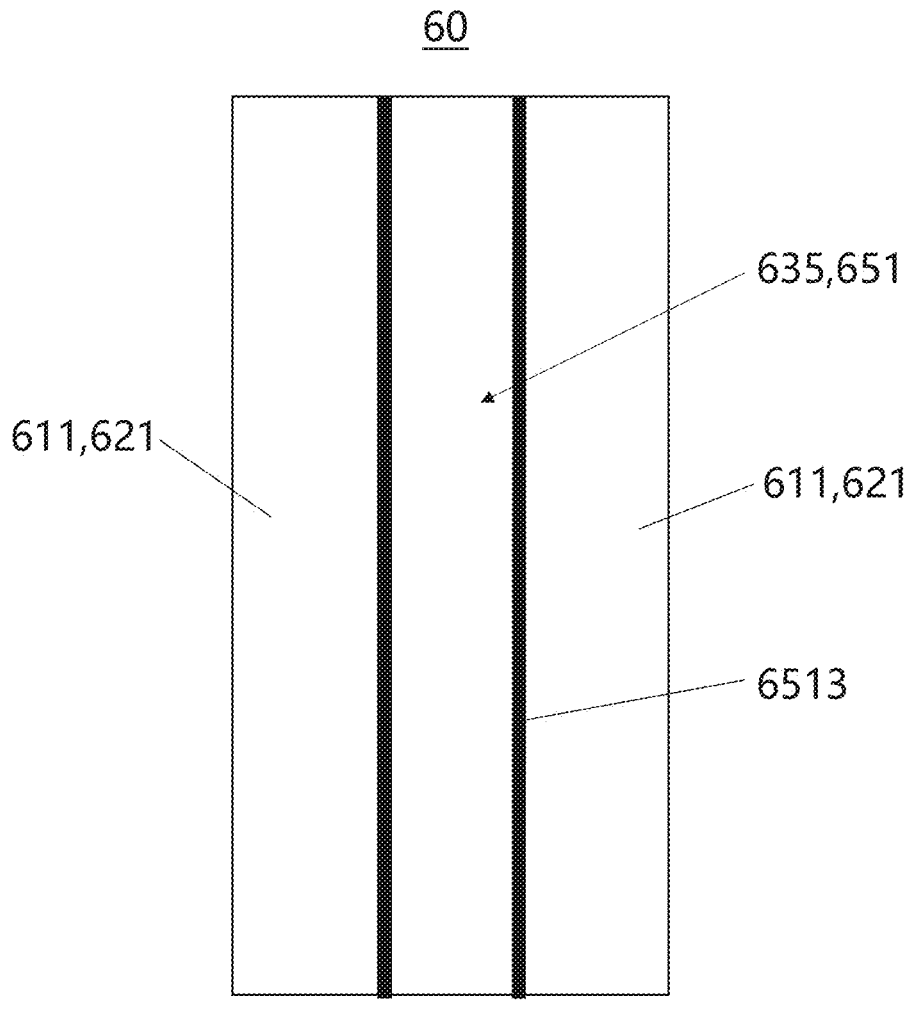
FIG. 9 is another isometric view of the sixth embodiment of the cushion airbag pad according to the present disclosure.

With further reference to FIG. 9, the one-way air inlet 60 in the sixth embodiment is substantially identical to the one-way air inlet 60 in the fifth embodiment, the difference is that, in the one-way air inlet member 60 of FIG. 9, the two inclined portions 6331 of the one-way air inlet member 60 in FIG. 8 are changed into a linear shape, and are linearly connected to two side edges 6511 of the one-way air inlet member 60 in FIG. 8, so as to form two linear side edges 6513, therefore, the one-way air inlet member 60 of FIG. 9 is formed by attaching the upper sheet 61 and the lower sheet 62 in a film shape along two parallel linear portions 6513.

Figure 10:
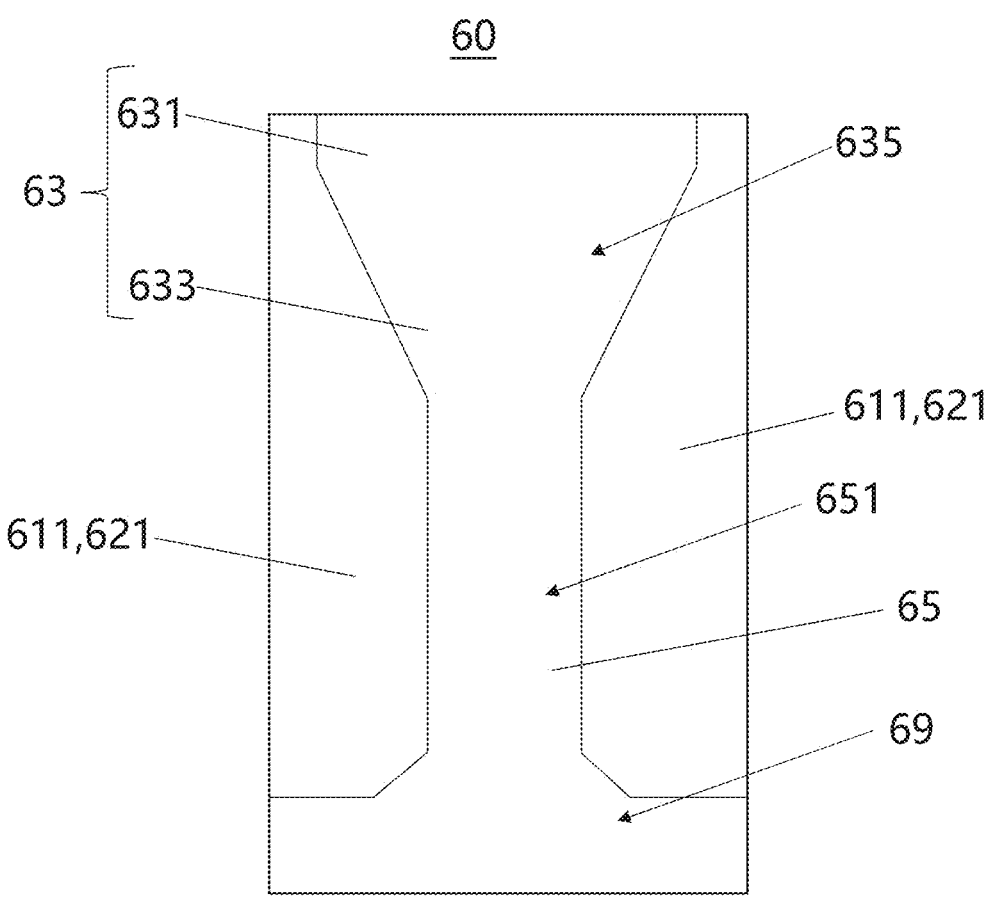
FIG. 10 is an isometric view of the one-way air inlet member of the seventh embodiment of the cushion airbag pad according to the present disclosure.

With further reference to FIG. 10, the one-way air inlet member 60 in the seventh embodiment is substantially the same as that in the second embodiment, except that the one-way air inlet member 60 further includes an anti-leak portion 69. The anti-leak portion 69 is connected to one end of the inlet air passage 651, and is accommodated in the second airbag 4. The side edges 611 and 621 of the upper sheet 61 and the lower sheet 62 at the anti-leak portion are not integrally bonded to each other. When the gas enters the anti-leak portion 69 through the air inlet passage 651, the upper sheet 61 and the lower sheet 62 are separated from each other, and after the gas enters the second airbag 4 through the anti-leak portion 69, the upper sheet 61 and the lower sheet 62 at the anti-leak portion 69 are in contact with each other and are adsorbed together, so that the air inlet passage 651 is in a closed state. Since the side edges 611, 621 of the upper sheet 61 and the lower sheet 62 at the anti-leak portion 69 are not integrally bonded together, the area of mutual attraction between the upper sheet 61 and the lower sheet 62 becomes larger, thereby effectively preventing air leakage of the second airbag 4 through the anti-leak portion 69, and further providing a better air leakage preventing effect for the cushion airbag apparatus 100.

Figure 11:
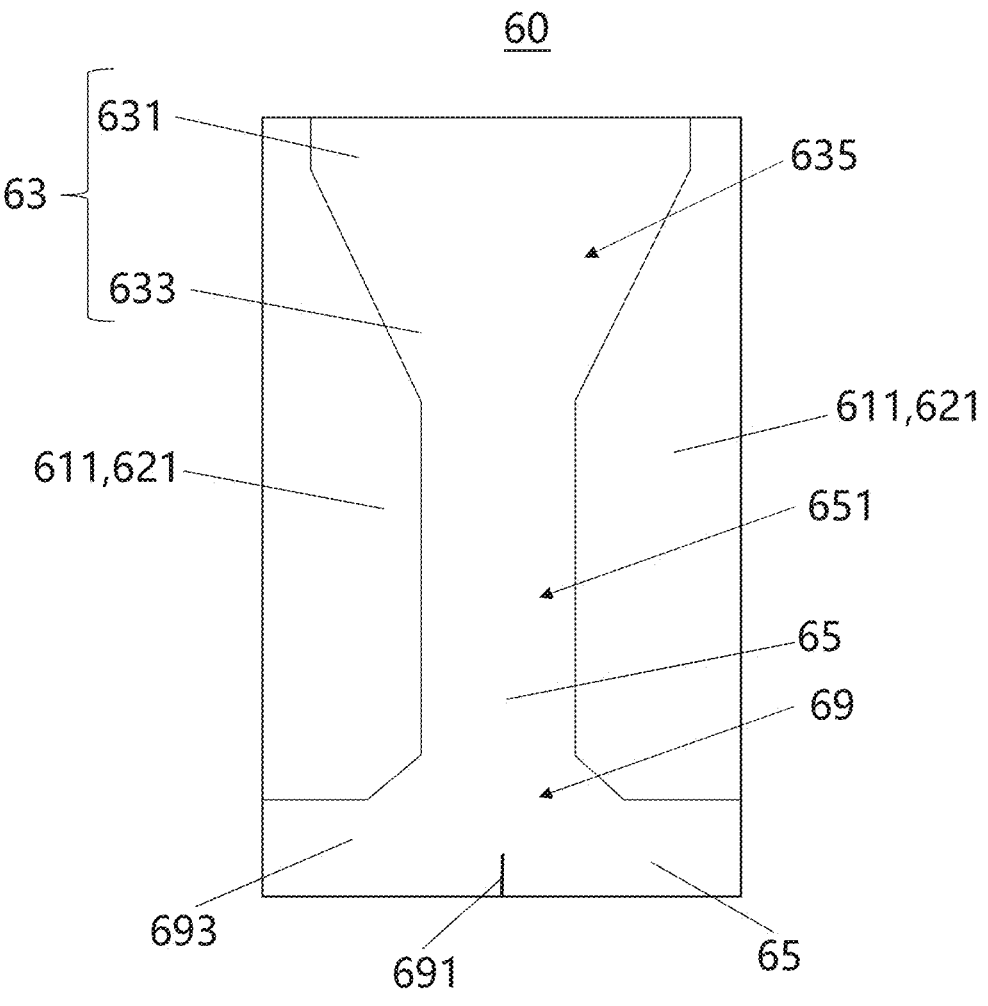
FIG. 11 is an isometric view of the one-way air inlet member of the eighth embodiment of the cushion airbag pad according to the present disclosure.

With further reference to FIG. 11, the one-way air inlet member 60 in the eighth embodiment is substantially the same as that in the seventh embodiment except that a fixing portion 691 is provided at a middle position of a bottom end of the anti-leak portion 69, and the fixing portion 691 defines an upper sheet 61 and a lower sheet 62 at the bottom end of the anti-leak portion 69. The fixing portion 691 divides the anti-leak portion 69 into a first anti-leak portion 693 and a second anti-leak portion 695. The upper sheet 61 and the lower sheet 62 at the fixing portion 691 are attached and fixed together with a up and down voltage.

During long-term use, the upper sheet 61 and the lower sheet 62 at the anti-leak portion 69 age. For example, due to a problem causing by material, the upper sheet 61 and the lower sheet 62 made of plastic appear an oil flow phenomenon, so that the upper sheet 61 and the lower sheet 62 are in a completely separated state and cannot be attracted to each other, thereby causing an air leakage phenomenon. In the one-way air inlet member 60 according to the eighth embodiment, even if the upper sheet 61 and the lower sheet 62 at the anti-leak portion 69 age, because the fixing portion 691 is provided, the upper sheet 61 and the lower sheet 62 do not completely separate from each other, thereby effectively preventing a separation phenomenon caused by aging of the upper sheet 61 and the lower sheet 62, and further ensuring prevention of air leakage.

It can be understood that the structure of the one-way air inlet member 60 can be designed according to practical requirements.

According to the cushion airbag apparatus in the present disclosure, by means of such a one-way air inlet member, the slow gas leakage can be prevented, thereby effectively preventing the air leakage of the cushion airbag pad, and thus no need to be frequently inflated, convenient to use.

The cushion airbag apparatus 100 may also include a one-way inlet valve (not shown) and a one-way outlet valve (not shown). The one-way air inlet valve is installed at the air inlet 1, so that gas can only be introduced from the air inlet 1 and cannot be discharged therefrom. The one-way air outlet valve is mounted at the air outlet 5 of the third airbag 8, so that gas can only be discharged from the air outlet and cannot be fed in, thereby ensuring one-way air deflation.

It should be understood that, the mounting portion 633 of the one-way air inlet member 60 is mounted to the first airbag 2 and the ventilation passage 3, and the mounting portion 633 of the one-way air inlet member 60 may also be mounted to the air inlet 1 and the outlet portion 65 is accommodated in the first airbag 2. At this time, the inlet portion 63 of the one-way air inlet member 60 is configured for receiving the gas from outside, and the outlet portion 65 communicates with the inlet portion 63, the external gas can enter into the cushion airbag pad 200 through a one-way air inlet member 60, and the inlet portion 63 remains open after being mounted to the air inlet 1 of the cushion airbag pad 200, the outlet portion 65 is accommodated in the cushion airbag pad 200, and is in a closed state in a non-air outlet state so as to prevent the gas in the cushion airbag pad from flowing back to the outside. It can also be understood that the mounting portion 633 of the one-way air inlet member 60 is mounted on at least one airbag 205 and at least one air passage 203 among the plurality of airbags 205 and the plurality of air passages 203 of the airbag cushion pad 200, and the outlet portion 65 is accommodated in another airbag 205 adjacent to the airbag 205. As long as it is installed in the mount portion 633 of the one-way air inlet member 60 according to actual needs.

The production process of the cushion airbag pad 200 of the first embodiment of the present disclosure comprises the following steps 1-10.

Step 1: preparing two sheets (an upper sheet 61 and a lower sheet 62) and a voltage mold.

The upper piece 61 and the lower piece 62 are placed between the voltage molds.

Step 2: attaching the two side edges 611, 621 of the two sheets to obtain a finished product (a one-way air inlet member 60, see FIGS. 3, 5-7, 10 and 11).

Wherein the side edges 611 and the side edges 621 of the two sheets are applied an upper and lower voltage by the voltage mold, so that the side edges 611 and the side edges 621 are adhered together, but the upper sheet 61 and the lower sheet 62 which are in contact with the insulator are not adhered together, thereby forming a mounting portion 633 and an outlet portion 65 which are in communication with each other. Referring again to FIGS. 3, 5-7, 10-11, the portion where the side edges 611 and the side edges 621 are adhered together is pressed up and down by the voltage mold.

It can be understood that, the bonding manner between the side edge 611 of the upper sheet 61 and the side edge 621 of the lower sheet 62 is not limited to the high frequency voltage bonding manner, and the side edge 611 of the upper sheet 61 and the side edge 621 of the lower sheet 62 may also be bonded together by means of upper and lower hot melt using a thermocompressor, and the side edge 611 of the upper sheet 61 and the side edge 621 of the lower sheet 62 may also be bonded together using thermosol. It can be understood that, the structure of the one-way air inlet member 60 is not limited to the structure formed by bonding the upper sheet 61 and the lower sheet 62, for example, the integrally molded cylindrical element is pressed into a flat structure to form the one-way air inlet member 60, so that the one-way air inlet member 60 having the flat structure is directly formed into the one-way air inlet member 60 without performing the step of bonding the upper sheet 61 and the lower sheet 62.

It can be understood that, referring again to FIGS. 8 and 9, in other embodiments, the side edges 611 of the upper sheet 61 and the side edges 621 of the lower sheet 62 of the one-way air inlet member 60 are not integrally attached together. In the one-way air inlet member 60 of FIG. 8, only the two inclined portions 6331 and the two side portions 6511 are partially attached together, while the side edges 611, 621, the air inlet space 635, and the upper sheet 61 and the lower sheet 62 of the air inlet passage 651 are not attached together. In the one-way air inlet member 60 of FIG. 9, the two inclined portions 6331 of the one-way air inlet member 60 in FIG. 8 are changed into a linear shape, and are linearly connected to two side edges 6511 of the one-way air inlet member 60 in FIG. 9, so as to form two linear side edges 6513. It can be understood that the structure of the one-way air inlet member 60 can be designed according to practical requirements.

The two sheets are made of the same material, for example, polyether TPU and polyester TPU (thermoplastic polyurethanes) or PVC, EVA or other plastic sheet materials.

Step 3: preparing the lower cushion body and the upper cushion body, the elastomer 21, the one-way air inlet member, the one-way air inlet valve and the one-way air outlet valve again.

An air outlet is formed in the lower cushion body.

Step 4: the one-way air outlet valve is attached to the air outlet of the lower cushion body.

Wherein, the one-way air outlet valve is arranged behind the air outlet of the lower cushion body, and the one-way air outlet valve and the lower cushion body are attached together by the top-bottom attachment of the high frequency machine.

Step 5: inserting the jig 300 into the one-way air inlet member 60.

When the jig 300 is inserted, firstly, the upper sheet 61 and the lower sheet 62 of the open end 631 of the one-way air inlet member 60 are separated, and then the jig 300 is inserted into the mounting portion 633 and the air outlet portion 65 of the one-way air inlet member 60 from the open end 631 of the one-way air inlet member 60. It can be understood that the opening end 631 can be omitted, and when the jig 300 is inserted into the mounting portion 633 and the outlet portion 65, the upper sheet 61 and the lower sheet 62 at the mounting portion 633 can be separated from each other.

Step 6: attaching a part of the one-way air inlet member 60 inserted with the jig 300 to the upper cushion body and the lower cushion body, so that the one-way air inlet member 60 forms an air inlet space 635 with one end opened.

A first airbag 2, a ventilation passage 3 and a second airbag 4 are formed on the upper cushion body. At this time, the one-way air inlet member 60 is placed in the first airbag 2, the ventilation passage 3 and the second airbag 4.

The outer surface of the upper sheet 61 and the outer surface of the lower sheet 62 of the mounting portion 633 of the air inlet member 6 are respectively bonded to the inner wall of the upper cushion body and the inner wall of the lower cushion body by the high frequency machine. Due to the existence of the jig 300, the inner surfaces of the upper sheet 61 and the lower sheet 62 at the outlet portion 65 of the air inlet member 6 are not bonded together. The material of the air inlet member 6 is the same as that of the upper cushion body and the lower cushion body, so that the outer surface of the upper sheet 61 and the outer surface of the lower sheet 62 of the mounting portion 633 of the air inlet member 6 are respectively attached to the inner wall of the upper cushion body and the inner wall of the lower cushion body.

Step 7: pulling out the jig 300 and forming an air inlet space with the one-way air inlet member 60 so that the one-way air inlet member 60 forms an air inlet space 635 with one end opened.

After the jig 300 is pulled out, the outer surface of the upper sheet 61 and the outer surface of the lower sheet 62 of the mounting portion 633 of the one-way air inlet member 60 are attached to the inner wall of the upper pad body and the inner wall of the lower pad body, respectively, so that the upper sheet 61 and the lower sheet 62 of the mounting portion 633 are in a separated state, and an air intake space 635 is formed, thereby forming the air inlet portion 63 always in an open state.

Step 8: placing the elastomer 21 into the upper cushion body.

Wherein, the elastomer 21 is placed into the first airbag 2 of the upper cushion body.

Step 9: attaching the one-way air inlet valve to the upper cushion body and the lower cushion body.

The one-way air inlet valve is placed at the position of the air inlet 1 and is in communication with the first airbag 2, and then the one-way air outlet valve and the lower cushion body are attached together by the top-bottom attachment of the high frequency machine.

Step 10: adhering the whole of the lower cushion body and the upper cushion body together to obtain a finished product of the cushion airbag pad 200.

The entire lower cushion body and the entire upper cushion body are attached together by a high frequency machine, thereby obtaining the cushion airbag pad 200.

It can be understood that, in the process for producing the cushion airbag pad 200 of the first embodiment, the step 4, step 8, step 9, and the like may be omitted, and the order of the steps may be adjusted according to practical requirements. Specifically, it can be understood that, when the cushion airbag pad 200 is an insole, the one-way air outlet valve can be omitted, and therefore Step 4 can be omitted. It can be understood that the elastomer 21 may be omitted in the cushion airbag pad 200, and inflation may be performed by using an air pump, therefore, Step 8 is omitted in the foregoing preparation method. It can be understood that the cushion airbag pad 200 can omit the one-way air inlet valve, and the air pump is aligned with the air inlet to inflate the air inlet; therefore, step 9 is omitted in the preparation method.

Referring to FIG. 7 again, the production process of the cushion airbag pad 200 of the second embodiment of the present disclosure comprises the following steps 11-20.

Step 11: preparing two sheets (an upper sheet 61 and a lower sheet 62) and insulating ink 67.

Wherein the insulating ink 67 may be applied to a predetermined position on the inner wall of the upper sheet 61 or the lower sheet 62. In the present embodiment, the insulating ink 67 is an anti-adhesive ink, but may be another insulating coating layer, as long as the insulating coating layer is used for preventing a part of the upper sheet 61 and the lower sheet 62 applied with the insulating coating layer from being adhered to each other. In the present embodiment, the insulating ink 67 may be applied to a predetermined position on the inner wall of at least one sheet (the upper sheet 61 or the lower sheet 62), or may be applied to both of the inner wall of the upper sheet 61 and the inner wall of the lower sheet 62.

Step 12: attaching the two side edges of the two sheets to obtain a finished product (one-way air inlet member 60, see FIG. 7).

Wherein the side edges 611 and the side edges 621 of the two sheets are applied an up-down voltage by using a high-speed wave machine, so that the side edges 611 and the side edges 621 are adhered together. Due to the presence of the insulating ink 67, a part of the inner wall of the upper sheet 61 and the inner wall of the lower sheet 62 coated with the insulating ink on the inner wall are not adhered together, forming the mounting portion 633 and the air outlet portion 65 which are communicated with each other. As can be seen from FIG. 7, the portion marked on the slope is the portion coated with the insulating ink 67, and the side edges 611 and the side edges 621 are adhered together is pressed up and down by the voltage mold. The two sheets are made of the same material, for example, polyether TPU and polyester TPU (thermoplastic polyurethanes) or PVC, EVA or other plastic sheet materials. In this embodiment, the insulating ink 67 is arranged on the mounting portion 633 of the one-way air inlet member 60 and the inner wall of the air inlet coating 652.

Step 13: preparing the lower cushion body and the upper cushion body, the elastomer 21, the one-way air inlet member, the one-way air inlet valve and the one-way air outlet valve again.

An air outlet is formed in the lower cushion body.

Step 14: the one-way air outlet valve is attached to the air outlet of the lower cushion body.

Wherein, the one-way air outlet valve is arranged behind the air outlet of the lower cushion body, and the one-way air outlet valve and the lower cushion body are attached together by the top-bottom attachment of the high frequency machine.

Step 15: attaching part of the one-way air inlet member 60 to the upper cushion body and the lower cushion body.

The upper cushion body has formed therein a first airbag 2, a ventilation passage 3 and a second airbag 4. At this time, the one-way air inlet member 60 is placed in the first airbag 2, the ventilation passage 3 and the second airbag 4.

The outer surface of the upper sheet 61 and the outer surface of the lower sheet 62 of the mounting portion 633 of the air inlet member 6 are respectively bonded to the inner wall of the upper cushion body and the inner wall of the lower cushion body by the high frequency machine. Due to the existence of the insulating ink 67, the inner surfaces of the upper sheet 61 and the lower sheet 62 at the air inlet coating 652 of the outlet portion of the air inlet member 6 are not bonded together. The material of the air inlet member 6 is the same as that of the upper cushion body and the lower cushion body, so that the outer surface of the upper sheet 61 and the outer surface of the lower sheet 62 of the mounting portion 633 of the air inlet member 6 are respectively attached to the inner wall of the upper cushion body and the inner wall of the lower cushion body.

The outer surface of the upper sheet 61 and the outer surface of the lower sheet 62 of the mounting portion 633 of the one-way air inlet member 6 are attached to the inner wall of the upper pad body and the inner wall of the lower pad body, respectively, so that the upper sheet 61 and the lower sheet 62 of the mounting portion 633 are in a separated state, and an air intake space 635 is formed, thereby forming the air inlet portion 63 always in an open state.

Step 16: placing the elastomer 21 into the upper cushion body.

Wherein, the elastomer 21 is placed into the first airbag 2 of the upper cushion body.

Step 17: attaching the one-way air inlet valve to the upper cushion body and the lower cushion body.

The one-way air inlet valve is placed at the position of the air inlet 1 and is in communication with the first airbag, and then the one-way air outlet valve and the lower cushion body are attached together by the top-bottom attachment of the high frequency machine.

Step 18: attaching the whole of the lower cushion body and the upper cushion body together to obtain a finished product of the cushion airbag pad 200.

The entire lower cushion body and the entire upper cushion body are attached together by a high frequency machine, thereby obtaining the cushion airbag pad 200.

It can be understood that, in the process for producing the cushion airbag pad 200 of the second embodiment, steps 14, 16, 17, and the like may be omitted, and the order of the steps may be adjusted according to practical requirements. Specifically, it can be understood that, when the cushion airbag pad 200 is an insole, the one-way air outlet valve can be omitted, and therefore Step 14 can be omitted. It can be understood that the elastomer 21 may be omitted in the cushion airbag pad 200, and inflation may be performed by using an air pump, therefore, Step 16 is omitted in the foregoing preparation method. It can be understood that the cushion airbag pad 200 can omit the one-way air inlet valve, and the air pump is aligned with the air inlet to inflate the air inlet; therefore, step 17 is omitted in the preparation method.

The cushion airbag pad can be manufactured by plane laminating, and the materials used for the single-sided convex airbag and the double-sided convex airbag mainly include TPU, elastic cloth, TPR glue, thermal sol, PVC, EVA or other plastic materials. For example, TPU glued with TPR glue adheres to the elastic fabric as the material of the upper cushion surface. The other example is that TPU glued with TPR glue adheres to the elastic fabric, then once again glued with TPR glue, and then one more layer of TPU is adhered.

If no air bag is required, the lower cushion surface is formed by laminating a non-elastic material or cloth to TPU or TPU glued with TPR glue.

The advantage of using TPU and cloth is elasticity. A massage cushion is inflated to saturation by the inflation of the air pump, and the airbag cushion will not get bigger or taller all the time and will be pulled by the fabric, for example, only the TPU has no fabric. The greater the inflation of the airbag pads, causing fatigue or even bursting.

In summary, the present disclosure can be applied to all cushion airbag pads, such as shoulder straps type shoulder pad, home seat cushion, waist cushion, mattress, medical mattress, automobile safety belt, shoe pad, motorcycle pad, bicycle pad, mouse pad, hemorrhoid pad, knee pad, helmet pad, bullet-proof vest pad and the like.

In conclusion, the present disclosure provides cushioning for a stressed part by means of one side outlet and one side inlet, which conforms to the force principle, and can generate a buffer effect by means of other flows, has the effect of reducing the pressure to people, and provides a new buffer method.

Furthermore, in conjunction with the design of a one-way air inlet valve, the direction of the air flow can be well controlled, thereby facilitating the realization of a buffering effect.

The foregoing description is merely a preferred detailed implementation of the present disclosure, but the scope of protection of the present disclosure is not limited thereto. Any people skilled in the art would be able to make equivalent replacements or changes within the technical scope disclosed by the present disclosure according to the technical solutions of the present disclosure and the inventive concept thereof, and all should be covered within the scope of protection of the present disclosure.

What is claimed is:

1. A one-way air inlet member mountable in a cushion airbag pad, the one-way air inlet member comprising:
   a lower sheet and an upper sheet opposite the lower sheet and covering the lower sheet;

an inlet portion defined by the lower sheet and the upper sheet at a side of the one-way air inlet member and configured for inhaling gas into the one-way air inlet member;

an outlet portion defined by at least one of the lower sheet and the upper sheet at another side of the one-way air inlet member, wherein the outlet portion is switchable between an open state and a closed state; the outlet portion exhales the gas from the one-way air inlet member in the open state; and for the outlet portion stops the gas exhaled from the one-way air inlet member from inhaling into the air inlet passage in the closed state;

an air inlet passage defined between the lower sheet and the upper sheet, in air communication with the inlet portion and the outlet portion, and configured for guiding the gas from the inlet portion to the outlet portion;

a joint portion located in the air inlet passage at the other side where the outlet portion is located, wherein the upper sheet and the lower sheet are connected to each other at the joint portion; and a gas flow path is defined from the inlet portion to the air inlet passage, wherein the gas flow path in the air inlet passage is unidirectional away from the air outlet portion after the gas flow path bypassing the joint portion;

wherein in a case the one-way air inlet member is triggered to inhale the gas, the upper sheet and the lower sheet at the outlet portion are spaced to each other such that the outlet portion is in the open state; in a case the one-way air inlet member is triggered to stop inhaling the gas, the upper sheet and the lower sheet are fitted snugly to each other such that the outlet portion is in the closed state.

2. The one-way air inlet member according to claim 1, wherein the inlet portion inhales the gas into the one-way air inlet regardless whether the outlet portion is in the open state or in the closed state.

3. The one-way air inlet member according to claim 2, wherein the one-way air inlet member is formed by attaching opposite ends of a side edge of the upper sheet and opposite ends of a side edge of the lower sheet.

4. The one-way air inlet member according to claim 3, wherein the upper sheet and the lower sheet are made of a same material.

5. The one-way air inlet member according to claim 2, wherein the outlet portion comprises at least two air inlet sub-passages, the at least two air inlet sub-passages are separated by the joint portion, and are respectively in communication with the inlet portion.

6. The one-way air inlet member according to claim 1, the joint portion is disposed corresponding to the outlet portion and extends along the gas flow path of the one-way air inlet member.

7. The one-way air inlet member according to claim 1, the outlet portion is further defined by two side edges of each of the upper sheet and the lower sheet, the two side edges are not integrally bonded to each other.

8. A cushion airbag pad comprising: a first airbag comprising an inputting port configured for inhaling gas from an external gas reservoir into the cushion airbag pad, a second airbag in air communication with the first airbag via a first air passage, a third airbag comprising an output port configured for exhaling gas in the cushion airbag pad to an exterior, an airbag group comprising multiple fourth airbags, wherein the airbag group is in air communication with the second airbag and the third airbag via multiple air passages; and a one-way air inlet member disposed in the first air passage, the one-way air inlet member configured for inhaling the gas from the first airbag into the second airbag and stopping the gas backflowing from the second airbag to the first airbag, wherein the one-way air inlet member comprises an upper sheet, a lower sheet opposite the upper sheet, an input opening defined by the upper sheet and the lower sheet and configured to maintain an open state, and an output opening defined by at least one of the upper sheet and the lower sheet and switchable between an open state and a closed state, wherein when the output opening is in the open state, the upper sheet is spaced away from the lower sheet at a position where the output opening is defined, when the output opening is in the closed state, the upper sheet is fitting snugly to the lower sheet;

wherein at least one air passage of the multiple air passages is not filled with any portion of the one-way air inlet member, a gas flow path in the at least one air passage is bidirectional.

9. The cushion airbag pad according to claim 8, when the output opening is in the closed state, the gas in the second airbag is stopped from back flowing into the first airbag.

10. The cushion airbag pad according to claim 9, wherein the upper sheet and the lower sheet are attached to an inner wall of the first airbag and an inner wall of the first air passage, and the output opening is accommodated inside the second airbag, the output opening is switched from the closed state to the open state by an airflow pressure from the second airbag, such that the gas flow pass is unidirectional from the first airbag to the second airbag via the one-way air inlet member.

11. The cushion airbag pad according to claim 10, wherein the one-way air inlet member is formed by attaching a side edge of a film-shaped portion of the upper sheet and a side edge of a film-shaped portion of the lower sheet, in a case that the upper sheet and the lower sheet are spaced to each other, the output opening is in the open state such that the gas flow path is from the first airbag to the second airbag via the output opening;

in a case that the upper sheet and the lower sheet is contacting with each other, the output opening is switched to the closed state such that no gas flow path is defined form the second airbag to the first airbag.

12. A manufacturing method of a cushion airbag pad, comprising the following steps:

preparing a lower cushion body an upper cushion body and a one-way air inlet member, wherein the upper cushion body includes multiple airbags and a peripheral area surrounding the multiple airbags, the one-way air inlet member includes an inlet portion, an outlet portion and an air inlet passage in air communication with the inlet portion and the outlet portion, and the one-way air inlet member includes a film-shaped upper sheet and a film-shaped lower sheet opposite the film-shaped upper sheet and joint with the film-shaped upper sheet at opposite long sides;

inserting a jig into the inlet portion of the one-way air inlet member, so as to space the upper sheet and the lower sheet of the inlet portion of the one-way air inlet member;

disposing the one-way air inlet member with the jig between the lower cushion body and the upper cushion body, and placing the inlet portion of the one-way air inlet member in one of the multiple airbags;

binding the upper sheet of the air inlet portion of the one-way air inlet member to the upper cushion body and the lower sheet of the air inlet portion of the one-way air inlet member to the lower cushion body by high-frequency welding method respectively;

pulling out the jig;

binding the peripheral area of the upper cushion body to the lower cushion body.

13. The manufacturing method of a cushion airbag pad according to claim 12, wherein a manufacturing method of the one-way air inlet member comprising the following steps:

Step a: preparing two sheets and a voltage mold, wherein the two sheets are disposed in the voltage mold;

Step b: attaching two side edges of the two sheets to obtain a finished product of the one-way air inlet member, the structure of the one-way air inlet member being formed as a structure in which two ends are open and two sides are closed, and the two ends are communicated with a middle portion.

14. The manufacturing method of a cushion airbag pad according to claim 12, wherein a manufacturing method of the one-way air inlet member comprising the following steps:

Step a: preparing two sheets and insulating ink, wherein the insulating ink is coated at a predetermined position on an inner wall of at least one sheet;

Step b: attaching two side edges of the two sheets to obtain a finished product of the one-way air inlet member, the structure of the one-way air inlet member being formed as a structure in which two ends are open and two sides are closed, and the two ends are communicated with the middle portion.

\* \* \* \* \*